US011029099B2

(12) United States Patent
De Jong et al.

(10) Patent No.: US 11,029,099 B2
(45) Date of Patent: Jun. 8, 2021

(54) SYSTEM AND METHOD FOR THERMOCHEMICAL STORAGE OF ENERGY

(71) Applicant: Nederlandse Organisatie voor toegepast-natuurwetenschappelijk onderzoek TNO, 's-Gravenhage (NL)

(72) Inventors: Adriaan Jan De Jong, The Hague (NL); Ruud Cuypers, Delft (NL); Johannes Wilhelmus Otto Salari, Utrecht (NL); Hendrik Pieter Oversloot, Roosendaal (NL); Laurens Daniel Van Vliet, The Hague (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 92 days.

(21) Appl. No.: 16/359,143

(22) Filed: Mar. 20, 2019

(65) Prior Publication Data
US 2019/0219340 A1    Jul. 18, 2019

Related U.S. Application Data

(63) Continuation of application No. PCT/NL2017/050630, filed on Sep. 21, 2017.

(30) Foreign Application Priority Data

Sep. 21, 2016 (EP) .................................. 16189930

(51) Int. Cl.
*F28D 20/00* (2006.01)
*F25B 17/12* (2006.01)
(Continued)

(52) U.S. Cl.
CPC ............ *F28D 20/003* (2013.01); *F25B 17/08* (2013.01); *F25B 17/12* (2013.01); *C09K 5/16* (2013.01); *F28F 2225/06* (2013.01); *Y02E 60/14* (2013.01)

(58) Field of Classification Search
CPC ........... F28D 20/003; F28D 2020/0017; C09K 5/047; F25B 17/08; F25B 17/12
See application file for complete search history.

(56) References Cited

U.S. PATENT DOCUMENTS

| | | | |
|---|---|---|---|
| 4,367,079 A | | 1/1983 | Wallsten |
| 4,581,049 A | * | 4/1986 | Januschkowetz ....... F25B 35/04 96/126 |

(Continued)

FOREIGN PATENT DOCUMENTS

| | | |
|---|---|---|
| EP | 0532683 A1 | 3/1993 |
| EP | 2674696 A1 | 12/2013 |

(Continued)

OTHER PUBLICATIONS

European Patent Office, International Search Report in corresponding International Application No. PCT/NL2017/050630, dated Jan. 16, 2018 (3 pages).

(Continued)

*Primary Examiner* — Devon Russell
(74) *Attorney, Agent, or Firm* — Leydig, Voit & Mayer, Ltd.

(57) ABSTRACT

A heat exchanger system is described for thermochemical storage and release. The system comprises a thermal exchange circuit with a heat exchanger fluid, the circuit further in thermal connection with a thermochemical module. The thermochemical module comprises a thermochemical material that stores and releases heat by a thermochemical exchange process under release or binding of a sorbate. The thermochemical module comprises a compartment (Continued)

structure that compartments the thermochemical material and further comprises a channel structure. This provides an exchange of the sorbate and the thermochemical material via the channel structure to the compartment structure.

9 Claims, 5 Drawing Sheets

(51) Int. Cl.
  *F25B 17/08* (2006.01)
  *C09K 5/16* (2006.01)

(56) References Cited

U.S. PATENT DOCUMENTS

| | | | | |
|---|---|---|---|---|
| 4,709,558 | A * | 12/1987 | Matsushita | F25B 17/08 62/480 |
| 5,298,231 | A * | 3/1994 | Rockenfeller | B01D 53/34 422/107 |
| 5,440,899 | A * | 8/1995 | De Beijer | F28D 20/003 165/104.12 |
| 5,916,259 | A * | 6/1999 | Pfister | F25B 17/08 257/E23.088 |
| 9,822,999 | B2 * | 11/2017 | Rockenfeller | F25B 17/083 |
| 2006/0257313 | A1 * | 11/2006 | Cisar | B01J 8/0457 423/648.1 |

FOREIGN PATENT DOCUMENTS

| | | |
|---|---|---|
| NL | 9001290 A | 1/1992 |
| NL | 1021088 C2 | 1/2004 |
| WO | WO 91/19155 A1 | 12/1991 |
| WO | WO 2006/134107 A1 | 12/2006 |
| WO | WO 2010/004302 A1 | 1/2010 |

OTHER PUBLICATIONS

Mark Roelands et al., "Preparation & Characterization of Sodium Sulfide Hydrates for Application in Thermochemical Storage Systems," Science Direct, Energy Procedia 70, pp. 257-266, published by Elsevier Ltd. (2015).

* cited by examiner

SYSTEM AND METHOD FOR THERMOCHEMICAL STORAGE OF ENERGY

CROSS-REFERENCED TO RELATED APPLICATIONS

This application is a continuation of International Application No. PCT/NL2017/050630, filed on Sep. 21, 2017, which claims priority to European Application No. 16189930.7, filed Sep. 21, 2016, which are both expressly incorporated by reference in their entireties, including any references contained therein.

TECHNICAL FIELD

The invention relates to the area of seasonal heat storage and systems and materials useful therefore.

BACKGROUND

There is a growing interest for the use of thermal solar collectors to obtain energy that can be used for various needs in houses, and particularly for space heating and provision of hot water. As an estimation, an area of 10-20 m² of solar panels would be sufficient for the annual heat demand of about 20 GJ of a well insulated dwelling, provided that the surplus could be used for the deficit in the winter. This requires storage of about 10 GJ. If this is stored in a hot water tank, this would require about 50 m³ (for a tank at 90° C.), which would be too big for domestic applications. An attractive alternative is to store heat by drying thermochemical materials (TCM) with an excess of solar heat from e.g. solar collectors in the summer. In the winter, it is then possible to hydrate the TCM and in this way to release the heat.

In general, thermochemical heat storage (TCS) is based on thermally reversible reactions such as:

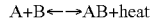

The reaction may contain more compounds and is not restricted to two compounds A and B. For the above reaction, the charging process to store the energy is an endothermic reaction wherein heat is supplied to split compound AB into compounds A and B. The energy is released in the form of heat when A and B are brought together (discharging process). A can be referred to as a sorption material (or sorbent), B is a working fluid (or sorbate), AB is working fluid adsorbed (or absorbed) on the sorption material. A and B can also both be fluids.

These reactions are also called sorption and desorption reactions. In case of water being one of the compounds A or B, these are hydration or dehydration reactions, for example:

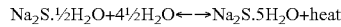

This sorption or hydration reaction provides for a high energy density of about 2.7 GJ per m³ of $Na_2S \cdot 5H_2O$, whereby the heat for evaporation is supplied from an external source. TCM do not only have a higher heat storage density compared to hot water storage, but also do not require thermal insulation. One only needs to keep chemical components separate, in the above case dried sodium sulfide and water, which is ideal for seasonal storage.

Examples of TCM storage systems are known, e.g. from EP1525286. However, there are some problems in the use of TCM for thermochemical heat storage. With thermochemical materials in the form of hygroscopic salts, potential storage densities of 1-3 GJ/m³ are possible, significantly higher than hot water storage, but for these materials undesirable processes could play a role especially at higher temperatures, such as melting, coagulation, volume changes during hydration or dehydration, scaling, corrosion, decomposition, and other undesirable chemical side reactions.

U.S. Pat. No. 4,357,079 discloses a heat exchanger system wherein sheets of cellulose form porous material used as a carrier for sorbent material. The sheets are carried by corrugated spacers, providing access for a sorption gas, via channels formed by the spacer. The disclosure relies on the immersion of gas tight containers with thermochemical material in a water circuit to optimize heat transport. This concept requires that the system is totally immersed in water.

From U.S. Pat. No. 5,440,899 it is known to enhance hygroscopic salts with fibrous materials for optimizing the recrystallization process and for heat transport purposes. However, there remains a desire to provide for high storage density at a given desorption temperature, preferably a factor higher than that of zeolite and with low desorption temperatures, so that the negative effects mentioned herein-above are reduced or disappear. Furthermore, it is desired to provide a more effective exchange of heat and evaporation process in the hydration reactions indicated above.

SUMMARY

In order to address at least some of the above desires, the present invention provides, in one aspect, a heat exchanger system for thermochemical storage and release is provided. The heat exchanger system comprises a thermal exchange circuit formed by circuit walls with a heat exchanger fluid. The circuit is in thermal connection with a thermochemical module, the thermochemical module comprising a thermochemical material that stores and releases heat by a thermochemical exchange process under release or binding of a sorbate. The thermochemical module further comprises a multitude of largely parallel oriented fibers, and a planar structure of thermoconductive strips that extend between the fibers and the circuit walls and that thermomechanically connects to the circuit walls. The fibers comprise a microporous wall that defines a first channel that comprises thermochemical material that stores and releases heat by a thermochemical exchange process under release or binding of a sorbate. In addition, a multitude of second channels is formed in the complementary space between the fibers, to provide an exchange of the sorbate to the thermochemical material via the microporous wall to the second channels, said second channels connected to an exhaust.

The main advantage of improving heat and sorbent transport properties in anisotropical fashion by inhomogeneous structures such as heat conducting fibers and vapor channels in contrast to homogeneous addition of heat conducting material or globally homogeneous porous structures is that inhomogeneous addition allows optimization of transport properties in just the required direction, minimizing the amount of additives. The thermoconductive structures connect to the circuit walls that contain the heat exchanger fluid and thus provide the advantage that heat transport is separated from the direction of the sorbent flows, while the heat is efficiently transported towards the circuit walls.

A heat-exchanger fluid has capacity to store and transport heat, of which many examples such as water are known. By heating the thermochemical material by heat conducted via the heat exchange circuit, the thermochemical material is separated into chemical constituents, so that thermochemical agent is extracted from the material e.g. in the form of a vapor. In an embodiment, the agent is a sorbate, e.g. water, and the vapor is water vapor.

The channel structure, with its directional structure, efficiently enhances vapor transport towards the vapor volume in the reactor vessel. Similarly, by a heat transport structure heat flow is enhanced. Vapor and heat channels perpendicular to the required direction are not necessary, and are omitted, thereby increasing heat storage density in another aspect, the present invention also provides a method for the preparation of the compartment structure. In this method, the thermochemical material is brought in a liquid phase and inserted in the compartment structure, while keeping the channel structure free from the liquid phase; and subsequently dried.

BRIEF DESCRIPTION OF THE DRAWINGS

The invention will be further elucidated in the figures.

DETAILED DESCRIPTION

A thermochemical (TCM) module is a module containing thermochemical material. A thermochemical module is typically provided with a heat source (heat exchanger), in order to control the temperature of the module. Thermochemical materials are able to undergo reversible reactions wherein sorption of a certain compound is associated with heat release. Typical thermochemical materials are known to a skilled person and are for examples salts, hydrates releasing heat when reacting with water to form (higher) hydrates, as exemplified above. An overview of some thermochemical materials is presented in P. Tatsidjodoung, N. Le Pierrès and L. Luo, «A review of potential materials for thermal energy storage in building applications», *Renew. Sustain. Energy Rev.*, vol. 18, n. 0, p. 327-349, February 2013. Generally, thermochemical materials can be divided into a group of sorption phenomena materials, e.g. zeolites, in which the sorbate is physically adsorbed and/or absorbed by the material, and chemical reaction materials, e.g. oxides/hydroxides and hydrate-forming salts, wherein the sorbate is chemically bonded to the material. In the latter case the sorption leads to the formation of another chemical compound (hydroxide from a respective oxide) or the sorbate is included into the crystal structure of the material, e.g. forming a hydrate. Particularly preferred in the present invention are the thermochemical materials that react with water (vapor, liquid) as the sorbate to release heat.

Figure 1A:
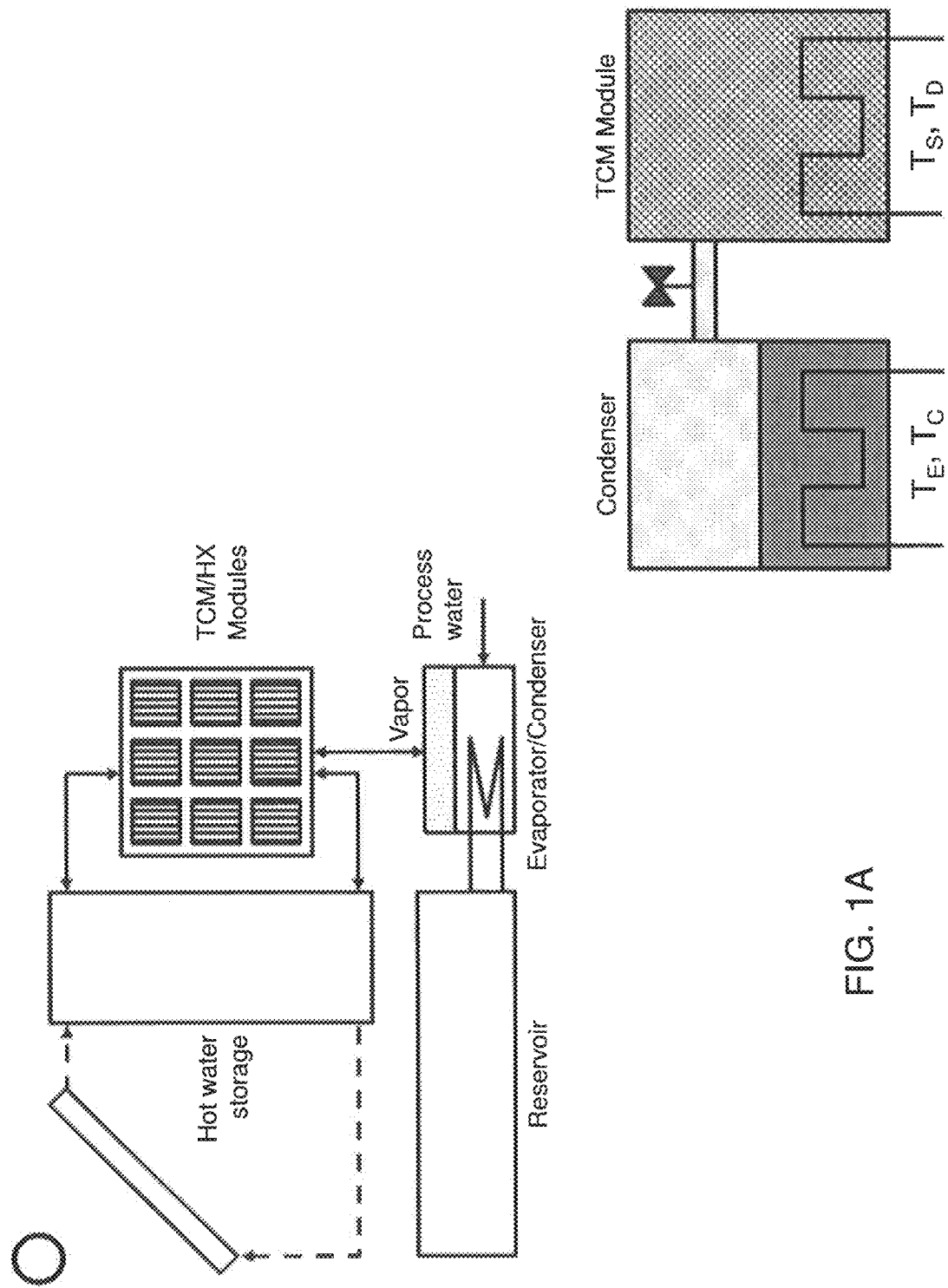
FIGS. 1A and 1B show an exemplary prior art setup of a TCM module.
Figure 1B:
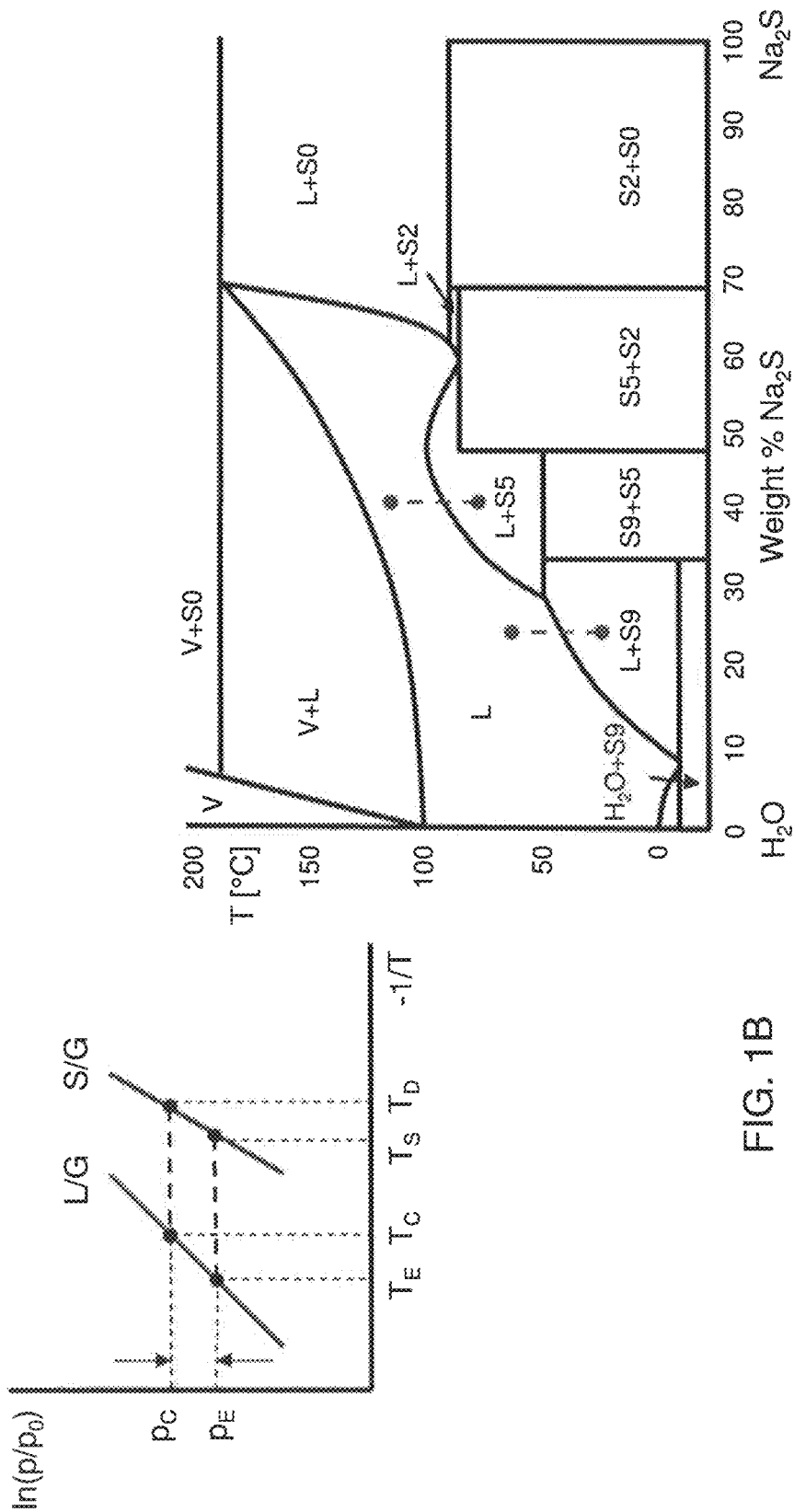

Prior art methods can be illustrated based on FIG. 1A as a typical application for heat storage, preferably for seasonal heat storage. In conformity with FIG. 1B, the following annotations are used: $T_E$ evaporation temperature, $p_E$ evaporation vapor pressure, $T_S$ sorption temperature, B water loading (g water/g material), $T_C$ condensation temperature, $p_C$ condensation vapor pressure, $T_D$ desorption temperature. FIG. 1B additionally shows a phase diagram for watery $Na_2S$ salt, wherein it is shown that the solid liquid phase can be attained for temperatures under 100° C., e.g. 90° C. that can be realistically produced. In an embodiment, the liquid phase is prepared at a temperature above 80 degrees Celsius and a weight percentage of $Na_2S$ is larger than 30%. This has an advantage that the watery content of the module can be kept low, while the module is filled with thermochemical substance.

In FIG. 1A a system is shown comprising a TCM module, connected through a valve for water vapor with a water condenser. The water vapor acts as an agent for heat release. In the case of water, a condenser is useful but not necessary to condense the vapor, for other agents closed circuits are preferred. The water is stored in the water condenser and vaporized at an evaporation temperature $T_E$ using a heat source. The vapor is then absorbed by the dehydrated sorbent in the TCM module at a sorption temperature $T_S$ releasing its enthalpy of absorption. The thereby generated heat can be used, e.g. for space heating or domestic hot water production.

To charge the thermochemical storage in the TCM module, the thermochemical module can be heated (e.g. heat from solar collectors) at a desorption temperature $T_D$ to release a certain amount of water vapor. The desorbed vapor may be condensed in the water condenser at a condensation temperature $T_C$ and the associated waste heat is released. The condensed water and dehydrated sorbent may be stored in separate tanks at ambient temperature. As long as these agents are not put in contact again, no heat losses occur.

In some embodiments, the thermochemical material used in the method of the present invention is selected from the group consisting of zeolites, silica gel, hygroscopic salts, metal-organic frameworks (MOF), carbon, and aluminum phosphates. In some preferred embodiments, the thermochemical material is a sorption phenomenon material, such as zeolites, silica gel, MOF, carbon and aluminum phosphates. An advantage of such materials is that they typically do not swell/shrink during (de)sorption and therefore exhibit a rather good stability during recycling. A disadvantage is however that sorption phenomenon materials usually have a rather low heat storage density. In other preferred embodiments, the thermochemical material used in the method is a chemical reaction material, e.g. hygroscopic salts. Salts possess a rather high heat storage density for any typical reversible reaction but the sorption/desorption processes are likely to disrupt the crystal structure, which leads to a lower recycling stability. The hygroscopic salts are usually capable of forming hydrates. Preferably, the hygroscopic salt is selected from the list consisting of chlorides, sulfates, iodides, nitrates, sulfides and its hydrates. Examples are sodium sulfide, magnesium chloride and their hydrates.

In some embodiments, multiple thermochemical modules may comprise different thermochemical materials. For example, one thermochemical module may comprise a sorption phenomenon material, and the other one a chemical reaction material. In one of the embodiments, the thermochemical module used as a condenser contains silica gel, while the other thermochemical module contains a hygroscopic salt. In another embodiment, both TCM modules contain a hygroscopic salt.

Also the weight of the thermochemical material can be varied. In some embodiments, the thermochemical modules contain the same amount of the thermochemical material, while in other embodiments it can be advantageous to use more material in one of the TCM modules, e.g. in the one which works as a condenser. This means that the TCM modules may have the same or different volumes. In some embodiments, it is preferred to use identical TCM modules having the same volume and the same thermochemical material.

A TCM module typically comprises a heat exchanger that allows to bring the module at a required temperature, e.g. $T_D$ for dehydration. The heat released in the TCM module can be collected through a heat exchanger present in that module.

Since the processes of sorption and desorption are interrelated, the present invention can equally be used as a method for sorption in a system for thermochemical storage according to the invention, wherein the sorption in the first thermochemical module is realized using the second thermochemical module as an evaporator, instead of a water evaporator. The advantage of this is that higher sorption temperatures in the second thermochemical module can be realized.

The system and the method described above are particularly useful for heat storage, preferably for seasonal heat storage but may be used for any other useful purpose. For the purpose of clarity and a concise description features are described herein as part of the same or separate embodiments, however, it will be appreciated that the scope of the invention may include embodiments having combinations of all or some of the features described.

Parts and percentages mentioned in the examples and through the description, are by weight, unless otherwise indicated. The sorption and desorption processes are illustrated using vapor pressure diagrams, which are described by the Clausius-Clapeyron equation:

$$dp/dT \; \Delta h/T\Delta v,$$

wherein p is the sorbate (water) pressure, T temperature, $\Delta h$ molar enthalpy and $\Delta v$ molar volume differences between the phases of the sorbate.

In the known TCM modules, to arrive at sufficient power, salt grains are embedded in a fin plated heat exchanger structure. For example, when using zeolite grains, an open structure with vapor transport is provided by spherical grain structures. Copper fin plates provided at short distances from grains transport heat out of the TCM module. To this end a thermal circuit with a thermocapacitive fluid, e.g. coolant is arranged to carry away heat produced by hydration or can deliver excess heat for dehydration.

The grain structure, with possibly additional porosity in the grains, can be regarded as a composite material with enhanced vapor transport. Similarly, heat materials such as graphite can be added to arrive at a composite material with enhanced heat transport. One way to realize this is to absorb liquid salt in Naturally Expanded Graphite (NEG).

The invention will now be illustrated in the following, non-limiting examples.

Figure 2A:
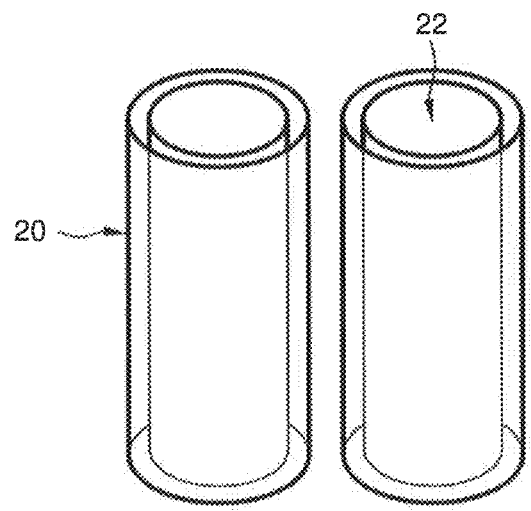
FIGS. 2A and 2B show examples of parts of a thermochemical module according to an aspect of the invention.
Figure 2B:
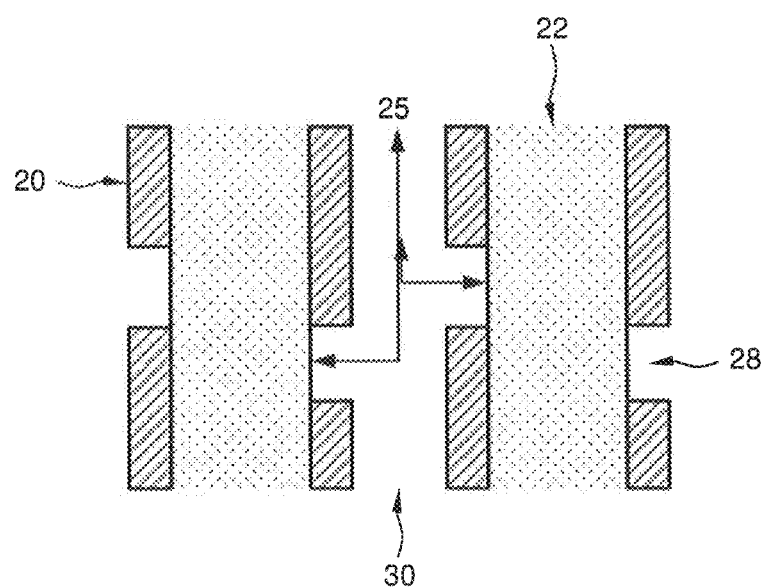
Figure 4A:
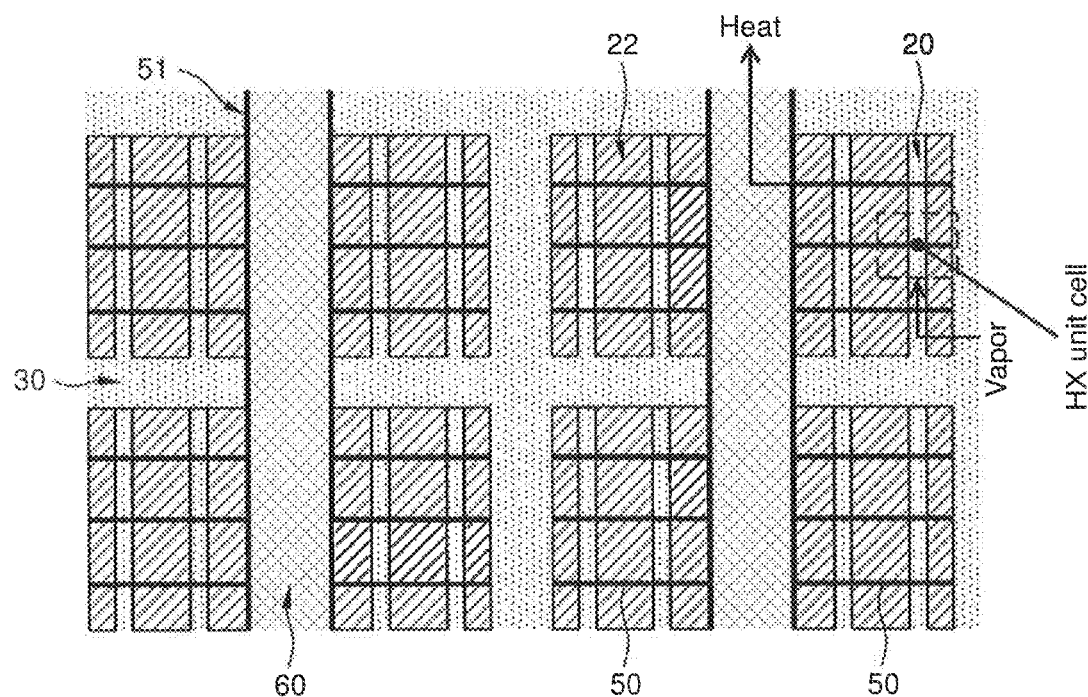
FIGS. 4A and 4B show a further embodiment with vapor channels.

In more detail, FIGS. 2A and 2B show examples of parts of a thermochemical module according to an aspect of the invention. The module, in one example, has a planar structure of a thermoconductive material that extends into the compartment structure in a direction away from circuit walls that form the thermal exchange circuit and that thermomechanically connects the circuit walls to the compartment structure. By a thermomechanical connection, a direct mechanical connection is provided for heat transport. In one embodiment, the planar structure is a fin plate, that can be provided e.g. by metal fin plates 50, e.g. as depicted in FIG. 4a that are connected to a thermal exchange circuit, with a thermocapacitive fluid, e.g. coolant.

In the embodiment of FIGS. 2A and 2B, showing in 2B a schematic longitudinal cross section of FIG. 2A, the thermochemical module comprises a compartment structure 20 that compartments the thermochemical material 22 and further comprises a channel structure 30, to provide an exchange of the thermochemical agent 25 (sorbate) and the thermochemical material via the channel structure 30 to the compartment structure. In this embodiment a channel structure is formed by elongated first channels 30, formed of e.g. a polymeric material selected from polyacrylate, polymethacrylate, polyvinylpyrrolidone, polyurethanes, polyepoxides poly(ethyl)methacrylate, poly(isoprene), polysiloxane (vulcanized), cellulose, cellulose derivative, poly(oxy-2,6-dimethyl-1,4-phenylene), polystyrene, polyacrylonitrile, or a copolymer of these, or a mixture of these. Here the compartment structure may thus be formed by elongated second channels 30 that are filled with thermochemical material; wherein the elongated first 20 channels are complementary to the second channels 30.

This material can be produced in the form e.g. of a cylinder, wherein the walls are formed e.g. from a cellulose, methylcellulose, ethylcellulose, cellulose acetate, or cellulose nitrate. To manufacture a thermochemical module, e.g. the cylinders 20 are filled with thermochemical material 22 is brought in a liquid phase by raising the temperature and inserted in the compartment structure. These cylinders 20 can be combined, in filled form, into the thermochemical module as shown in FIG. 3, so that a channel structure is formed to provide an exchange of the thermochemical agent 25 and the thermochemical material via the channel structure to the compartment structure. Also, by careful handling, the cylinders 20 can be filled in combined form, while leaving the channel structure open. In such an embodiment, the compartment channel 20 structure forms a volumetric complement of the channel structure 30 that provides access for the thermomechanical agent 25. In such a complementary arrangement, a large portion of the space that is not filled up by the thermochemical material may function as a channel, that is, provides access of the thermochemical agent to the thermochemical material, in order to have an optimal thermochemical interaction. However, this is optimal but not necessary—additional volume may be provided e.g. for mechanical integrity or heat conduction.

In an embodiment, the wall structure of the cylinders 20 forms an interface between first and second channels, which wall structure is transgressive to the thermochemical agent. For example, the cylinders as second channels may be provided with microperforations 28, to optimize interaction of the thermochemical agent and the thermochemical material. A typical perforation size 28 may be in the micron range, preferably too small to leak the thermochemical material into the channel structure when heated to reach a liquid phase that may occur due to over hydration. Indeed advantageously the pore size is small enough so that surface tension prevents leakage of liquid through the pores.

Figure 3A:
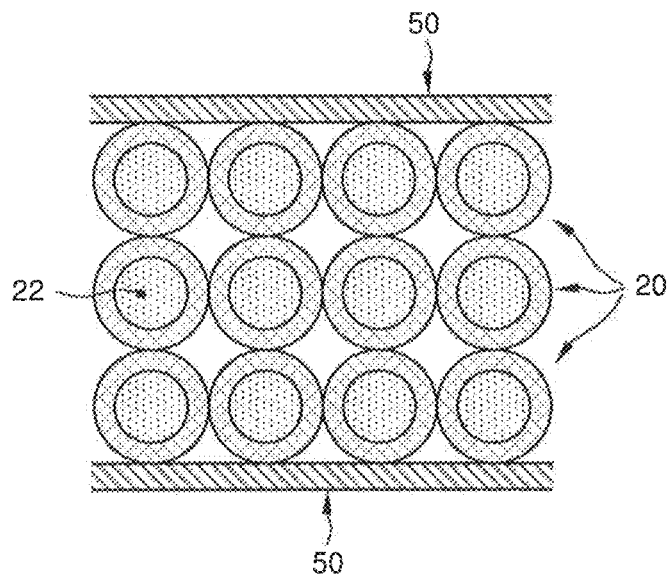
FIGS. 3A and 3B and 3C show a further exemplary implementations.

In FIG. 3A a first example is shown of a packed bundle of cylinders 20. The cylinders 20 are formed by porous polymer fibers filled with a thermochemical material 22. The porous fibers allow for an anisotropic vapor transport. These can be polymer tubes with porous walls, filled with salt/TCM. Wall porosity can be 50%. The fibers are kept parallel to fin plates 50 and are directed towards a reactor exhaust (not shown). Vapor transport of this composite TCM is then only in the required direction, no space is lost for unnecessary transport in perpendicular directions. Additional to confining the material 22, the fibers provide stability for the vapor channels 30 during successive cycles of hydration and dehydration. If the pores are sufficiently small and the polymer hydrophobic, the TCM might even be liquid and yet stay inside the tubes due to surface tension. This would protect the structure to unintentional occurrence of liquid states, such as $Na_2S.5H_2O$ above 83 degrees C. But it would also allow intentionally working with liquid TCM, such as $CaCl_2 \cdot 6H_2O$ above 35 degrees C. and higher hydration states. An additional advantage of the structure is that vapor sorption along TCM can be controlled, i.e. vapor can be sorbed more evenly along the TCM fiber dependent on a varying fiber wall porosity. One may even increase porosity along the fibers further away from the reactor exhaust to obtain perfectly homogeneous TCM sorption in the reactor. The structure of FIG. 3A can be provided as follows. Empty porous polymer tubes can be provided of the type for instance used in a fiber membrane contactors. These fibers or tubes may have a diameter as large as 1 mm. The tubes 20 can be filled with a salt solution in water, with the desired salt concentration, corresponding to the desired hydration state, indicated by reference numeral 22. This will require elevated temperature, according to the phase diagram of water and the salt of interest, cf. FIG. 1B for $H_2O$ and $Na_2S$. Here the state $Na_2S \cdot 5H_2O$ is represented by S5, $Na_2S \cdot 9H_2O$ by S9) and so on. For instance, with 40% of Nan at 110 degrees C., a solution is formed by which the polymer tubes can be filled. Cooling down below 50 degrees C. then will produce filled tubes with a mixture of the 5 and 9 hydrates.

Figure 3B:
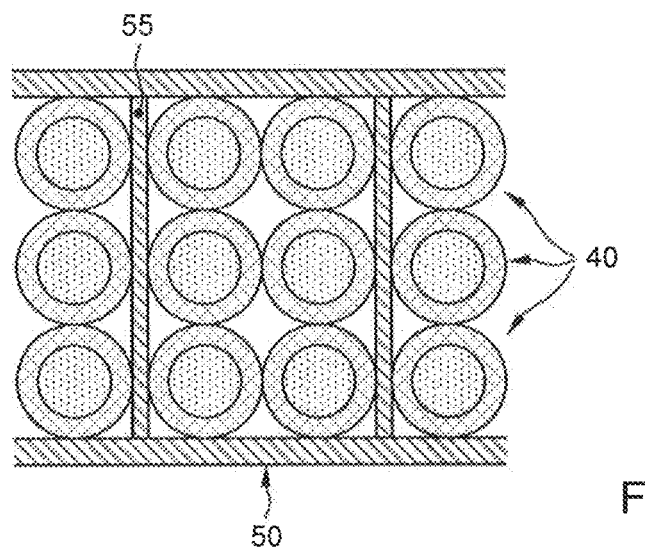

In another example, shown in FIG. 3B, enhanced heat transport, is provided by manufacturing the porous cylinder walls 40 of a good heat conducting material such as graphite. This provides good heat conductivity in the same direction as vapor transport, i.e. parallel to the cylinders 40 in axial direction. When the fibers walls are in good mechanical contact, heat transport will also be enhanced in perpendicular direction, which may be towards fin plates 50, but this does not provide a shortest path for heat from TCM to the fin plate. In cross direction to fibers, one may add a heat conducting structure 55 that connects to fin structures 50.

Figure 3C:
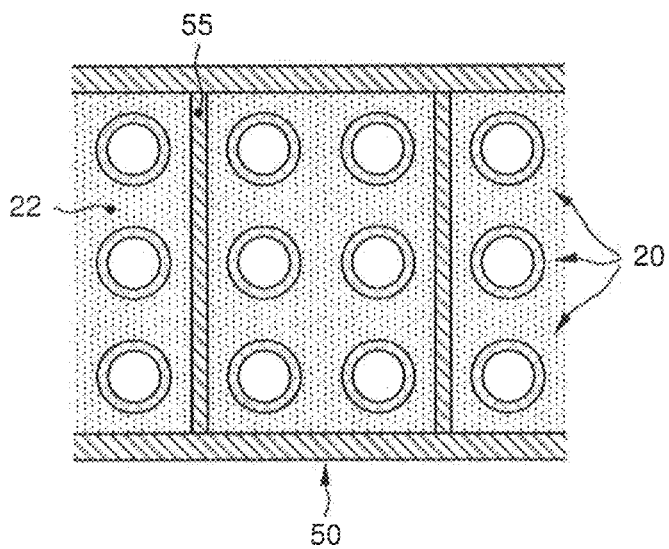

In yet another example, shown in FIG. 3C, the thermochemical material 22 is confined in the space complementary to the hollow fibers 20. This allow placing a perpendicular heat conducting structure 55 in direct contact with TCM, which may be more effective. The parallel heat conducting structure 55 may be a plate or fibers towards fin plates 50.

In FIG. 4A a further embodiment is shown, wherein a planar structure of a thermoconductive material is provided that extends into the compartment structure in a direction away from circuit walls 51 that form the thermal exchange circuit 60 and that thermomechanically connects the circuit walls 51 to the compartment structure. The vapor channels are formed as strips 50 are traversing the channel structure 20.

In the embodiment, compartments 30 may be formed that contain thermochemical material 22, and that are in communication with the channel structure, that preferably has a dominant direction along the direction of gravity. Thus, by vaporization of the thermochemical agent, the channel structure 20 can filled with a vapor of the thermochemical agent, and conversely, by heating the thermochemical material by heat conducted via the thermal exchange circuit, the thermochemical material is separated into chemical constituents, so that thermochemical agent is extracted from the material e.g. in the form of a vapor. In an embodiment, the agent is water, and the vapor is water vapor.

Figure 4B:
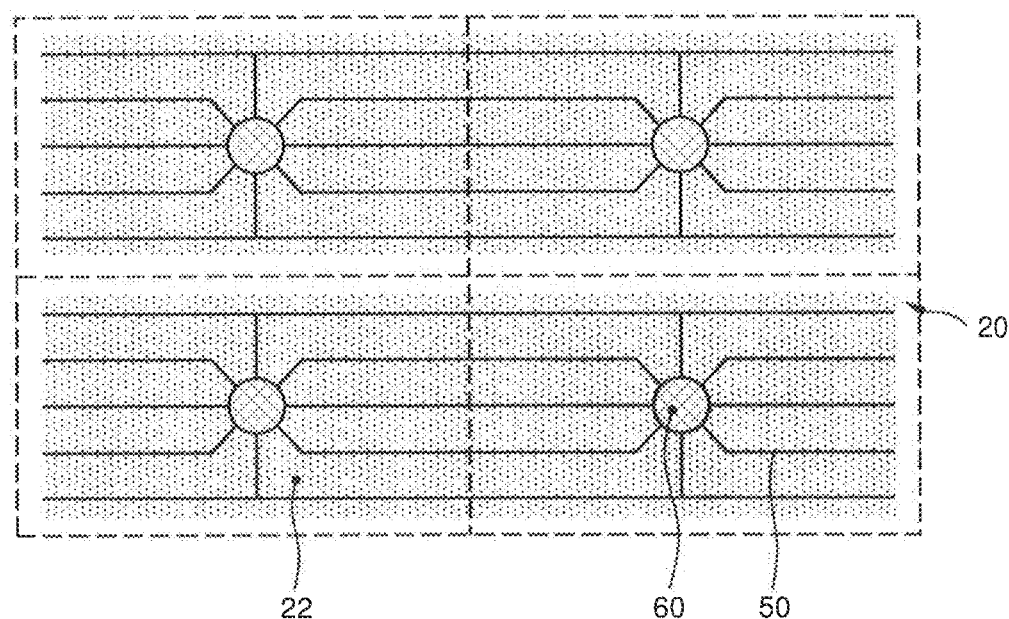

FIG. 4B shows a schematic plan view of the structure of FIG. 4a. To optimize heat conduction to and from the thermal exchange circuit, the planar structure 50 is formed of a thermoconductive material, e.g. copper, that extends into the compartment structure in a direction away from circuit walls 51 that form the thermal exchange circuit 60 and that thermomechanically connects the circuit walls 51 to the thermochemical material 22. In the Example, the configuration of FIG. 3C is used, i.e. the thermochemical material is provided in the compartment structure 30 forming a space complementary to the tubes 20. The strips may be formed, e.g. in the form of a tree structure rooting in the exchange circuit and expanding into the thermochemical compartments 30, typically in a planar way.

In an embodiment, the planar structure is formed as, or by strips 50 of metal foil extending from the circuit walls of thermal exchange circuit.

In an embodiment, the thermochemical module may be manufactured with the planar structure formed by strips 50 of metal foil extending from the circuit walls 51. For example, metal foil may be reinforced by thickened reinforcements that allow passage of the thermochemical exchange circuit; the compartment structure and the channel structure. In the manufacturing process, cylinders may be inserted passing through a foil structure. The cylinders 20 may be formed as vapor channels, or may be filled with thermochemical material, wherein the vapor channels are formed by the spaces in between the cylinders. To optimize the manufacturability and improve the thermal conductivity, metal foil may be reinforced by thickened reinforcements that allow passage of the thermochemical exchange circuit; the compartment structure and the channel structure.

In another embodiment, the structure may be formed by additive manufacturing, e.g. in a multicomponent additive manufacturing process. Also, parts of the thermochemical compartments may be manufactured by additive manufacturing.

In an example, a thermochemical storage can be formed with a zeolite used as thermochemical material. In this example, Zeolite 13X is used as TCM and water as a sorbate. In another example, different TCM materials may be used such as: Zeolite Z13X and SG125. For instance, two TCM modules may be used with different materials. One module uses Zeolite Z13X and the other one Silicagel Grace 125 of equal mass. The module with SG125 is used here as a condenser for the zeolite module. The modules and the water condenser are connected through a central tube as explained herein-above. In yet another example, different TCM materials may be used such as $Na_2S$ and SG125.

In this example, a TCM module with hygroscopic salt $Na_2S$ may be dried using a silica gel containing module. The modules and the water condenser are connected through a central tube as explained herein-above.

This system allows to carry out desorption of $Na_2S$ at 70° C. instead of >90° C. with e.g. SG125.

In yet another example, multiple stages of $MgCl_2$ may be used, for instance, $MgCl_2$ is used in different TCM modules. The modules and the water condenser are connected through a central tube as explained herein-above. In this example a sorption method is illustrated that allows to achieve a higher temperature $T_S$, which in turn can be used for higher heat needs such as DHW (60° C.).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A heat exchanger system for thermochemical storage and release, comprising a thermal exchange circuit formed by circuit walls with a heat exchanger fluid, the circuit further in thermal connection with a thermochemical module, the thermochemical module comprising:
    a thermochemical material that stores and releases heat by a thermochemical exchange process under release or binding of a sorbate,
    a multitude of largely parallel oriented fibers, and
    a planar structure of thermoconductive strips that is connected to the thermal exchange circuit and that extends between the fibers and the circuit walls and that thermomechanically connect the circuit walls to the thermochemical material,
    wherein each of the fibers comprise a microporous wall, the multitude of largely parallel oriented fibers defining a plurality of first channels that comprises the thermochemical material that stores and releases heat by a thermochemical exchange process under release or binding of a sorbate, and
    wherein a multitude of second channels is formed, in the complementary space between the fibers, to provide an exchange of the sorbate to the thermochemical material via the microporous wall, said second channels connected to an exhaust, said thermoconductive strips traversing the structure of second channels.

2. The heat exchanger system according to claim 1, wherein the channel wall structure comprises a polymeric material selected from the group consisting of: polyacrylate, polymethacrylate, polyvinylpyrrolidone, polyurethanes, polyepoxides poly(ethyl)methacrylate, poly(isoprene), polysiloxane (vulcanized), cellulose, cellulose derivative, poly(oxy-2,6-dimethyl-1,4-phenylene), polystyrene, polyacrylonitrile, a copolymer of these polymeric materials, and a mixture of these polymeric materials.

3. The heat exchanger system according to claim 2, wherein the cellulose derivative is selected from the group consisting of: cellulose, methylcellulose, ethylcellulose, cellulose acetate, and cellulose nitrate.

4. The heat exchanger system according to claim 1, wherein the strips are reinforced by thickened reinforcements that allow passage of the thermochemical exchange circuit and the first and second channel wall.

5. The heat exchanger system according to claim 4, wherein the reinforcements are annular in form.

6. The heat exchanger system according to claim 1, wherein the thermochemical module is formed by multicomponent additive manufacturing process.

7. The heat exchanger system according to claim 1, wherein the thermochemical material is selected from the group consisting of: zeolites, silica gel, hygroscopic salts, metal organic frameworks (MOF), carbon, and aluminum phosphates and their hydrates.

8. The heat exchanger system according to claim 7, wherein the hygroscopic salt is selected from the group consisting of: chlorides, sulfates, phosphates, bromides, iodides, nitrates, sulfides and their hydrates.

9. The heat exchanger system according to claim 1, wherein the sorbate comprises water, $NH_3$, $CH_3OH$, or $C_2H_5OH$.

* * * * *